United States Patent
Parlato

[19]

[11] Patent Number: 5,820,464
[45] Date of Patent: Oct. 13, 1998

[54] FLEXIBLE SHAFT ASSEMBLY

[75] Inventor: Brian D. Parlato, Neshanic Station, N.J.

[73] Assignee: S.S. White Technologies Inc., Piscataway, N.J.

[21] Appl. No.: 778,905

[22] Filed: Jan. 3, 1997

[51] Int. Cl.⁶ .................................................. F16C 1/00
[52] U.S. Cl. ............................................. 464/58; 464/183
[58] Field of Search ................................ 464/51, 52, 57, 464/58, 59, 174, 179, 183

[56] References Cited

U.S. PATENT DOCUMENTS

| | | | |
|---|---|---|---|
| 492,266 | 2/1893 | Browne | 464/58 |
| 798,009 | 3/1905 | Arens | 464/52 |
| 906,113 | 12/1908 | Curtis | 464/174 |
| 1,590,666 | 6/1926 | Angell | 464/52 |
| 1,683,023 | 9/1928 | Champion | 464/174 |
| 2,036,528 | 4/1936 | Kesling | 464/183 |
| 3,085,406 | 4/1963 | Hanebuth | 464/174 |
| 3,146,576 | 9/1964 | Wezel | 464/58 |
| 3,855,817 | 12/1974 | Stuemky et al. | 464/51 |
| 4,112,708 | 9/1978 | Fukuda | 464/52 |
| 4,149,391 | 4/1979 | Driver | 464/57 |
| 4,424,045 | 1/1984 | Kulischenko et al. | 464/52 |

FOREIGN PATENT DOCUMENTS

| | | | |
|---|---|---|---|
| 181689 | 3/1907 | Germany | 464/52 |
| 2739454 | 3/1978 | Germany | 464/52 |
| 0453105 | 9/1936 | United Kingdom | 464/52 |
| 2015699 | 9/1979 | United Kingdom | 464/58 |

Primary Examiner—Eileen A. Dunn
Attorney, Agent, or Firm—Michaelson & Wallace; Peter L. Michaelson; Jeremiah G. Murray

[57] ABSTRACT

A flexible shaft assembly for transmitting rotary motion between spaced components that are mounted on articulated members. The flexible shaft, which has a significant bending flexibility, comprises a proximal section connected to a driver device, a distal section connected to a driven component, and an intermediate section. The proximal and distal sections, which are free to bend, rotate about curved axes. One or more rigid sleeves coaxially mount on the intermediate section for reducing torsional deflections of the shaft as it rotates.

28 Claims, 4 Drawing Sheets

FLEXIBLE SHAFT ASSEMBLY

BACKGROUND OF THE INVENTION

1. Field of the Invention

The invention relates to flexible shafts, and more particularly, to techniques of using flexible shafts to accurately transmit rotary motion between unaligned and/or obstructed components.

2. Description of the Prior Art

The use of flexible shafts provides machine designers with limitless possibilities in positioning motor and driven components. It has been known that flexible shafts, which are usually light weight and powerful, normally operate at a higher efficiency and with less frictional loss than flexible couplings, gears, U-joints, belts and pulleys, and like devices. As such, flexible shafts have been used successfully in a wide variety of apparatus ranging from complex aircraft to simple toys. They can be found in heavy construction equipment, high-precision surgical apparatus, automobiles, robotics, and numerous other applications.

Flexible shaft assemblies generally comprise a flexible rotating shaft, sometimes called a core, with end fittings for attachment to mating parts. The core of most flexible shafts includes a thin flexible mandrel on which layers of wire are wound in different directions (e.g., see FIG. 1). Flexible shafts transmit rotary motion much like a conventional rigid shaft; but, the flexible shaft, which has a variable axis of rotation, can be routed over, under and around obstacles that would make using the rigid shaft impractical (e.g., see FIGS. 3 and 4). Flexible shafts, which primarily couple unaligned and/or blocked components, are also used in apparatus where the driven component changes position with respect to the drive motor; many portable power tools include this feature. Additionally, since flexible shafts do not need the tight tolerances that rigid shafts require, flexible shafts have replaced rigid shafts in many applications where the rotating parts are in substantial alignment.

Flexible shaft assemblies often include a protective outer casing in which the shaft rotates. This casing normally has its own fittings that keep it stationary while the shaft rotates. In addition to protecting the rotating shaft, the casing is often used to hold the shaft in a particular position or configuration. In other instances, usually where short flexible shafts have been used to couple high-speed rotary components that are virtually aligned, a shaft assembly may include a rigid casing that attaches to and covers most of the shaft. This rigid casing, which rotates with the shaft and permits the ends of the shaft to bend slightly to effect proper alignment, prevents the shaft from developing high-frequency vibrations during operation.

Although prior art flexible shafts have served the purpose, they have not proved entirely satisfactory for use in accurately transmitting low-torque rotations over great distances, especially when the operating path has sharp bends. For example, many prior art control systems, such as found in robotics, automobiles, aircraft, surgical tools, and the like, require that angular motion occurring at one point be detected and accurately transmitted to components located at another remote point in the system. Heretofore, many control systems have used electrical circuits to accomplish this task because mechanical devices have not always proved effective. On the other hand, the use of electric circuits is not always feasible or practical. In some situations, electrical power is not available. In other applications the use of electricity may be unsafe or too costly. Consequently, those concerned with the development of flexible shafts have long recognized the need for improved shaft assemblies capable of detecting and accurately transmitting angular motion and/or low-torque rotations over relatively long tortious paths and/or between components that change relative positions.

SUMMARY OF THE INVENTION

Advantageously, the present invention remedies these and other deficiencies in the art by providing a technique, that relies on using a flexible shaft to accurately transmit rotary motion over a tortious path with a minimum of torsional deflection in the flexible shaft.

Specifically, the present invention provides a technique for coupling spaced components with a flexible shaft having a variable torsional stiffness along its length. To do so, the invention provides a unique flexible shaft assembly having a first portion with high bending flexibility that is capable of rotating about curved axes, and a second portion having a torsional stiffness substantially greater than that of the first section. In particular, the flexible shaft has a proximal section, a distal section and an intermediate section. The proximal and distal sections are each capable of being rotated about curved axes. One or more stiffeners are fixed to the intermediate section. Each stiffener has a torsional stiffness substantially greater than that of the flexible shaft.

Another aspect of the invention includes a system for transmitting rotary motion between spaced rotary components. The system comprises a first rotary component, a second rotary component spaced from the first rotary component, and a flexible shaft having a predetermined bending flexibility. The flexible shaft has a proximal section connected to the first rotary component, a distal section connected to the second rotary component, and an intermediate section. The proximal and distal sections are each capable of being rotated about curved axes. A stiffener is fixed to the intermediate section for preventing the intermediate section from undergoing substantial torsional deflection when the flexible shaft rotates.

Still another aspect of the invention includes a method of transmitting rotary motion between spaced components. The method comprises the following steps: forming a flexible shaft with a predetermined bending flexibility and having proximal and distal sections capable of being rotated about curved axes, and an intermediate section; connecting a rotary driver component to an end of the proximal section; connecting a rotary driven component to an end of the distal section; preventing the intermediate section from undergoing substantial torsional deflection when the rotary driver component rotates the flexible shaft; and rotating the flexible shaft with the rotary driver component to rotate the rotary driven component.

Yet a further aspect of the invention comprises a method of connecting a driver device to a driven component with a flexible shaft that extends over a path having at least one linear section and one curved section with a bend of at least forty-five degrees. The flexible shaft has a predetermined torsional stiffness. The method comprises the steps of: determining the portion of the flexible shaft to be located at the linear section; securing at least one stiffener, having a torsional stiffness substantially greater than the torsional stiffness of the flexible shaft, to that portion of the flexible shaft; and connecting the driver device to the driven component with the flexible shaft such that the stiffener extends over the linear section.

BRIEF DESCRIPTION OF THE DRAWINGS

The teachings of the present invention can be readily understood by considering the following detailed description in conjunction with the accompanying drawings, in which.

DETAILED DESCRIPTION OF THE PREFERRED EMBODIMENT

Figure 1:
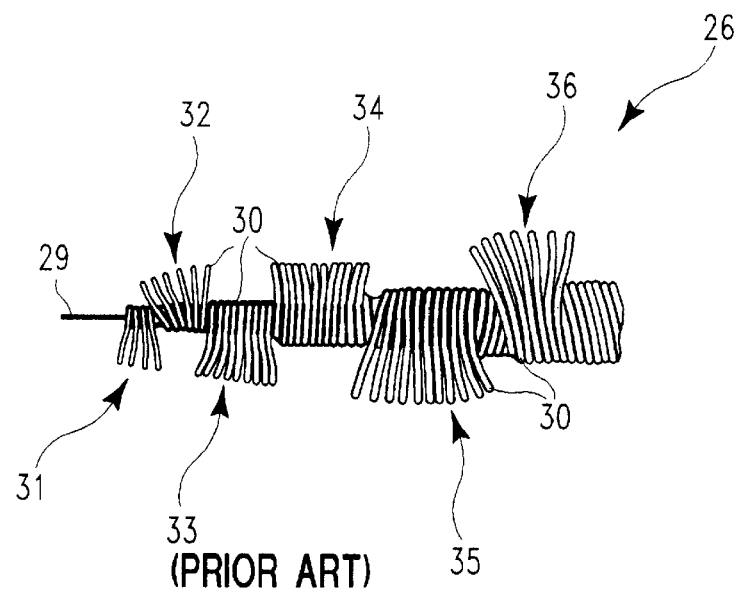
FIG. 1 is a pictorial view, with parts broken away, showing the construction of a prior art flexible shaft.
Figure 2:
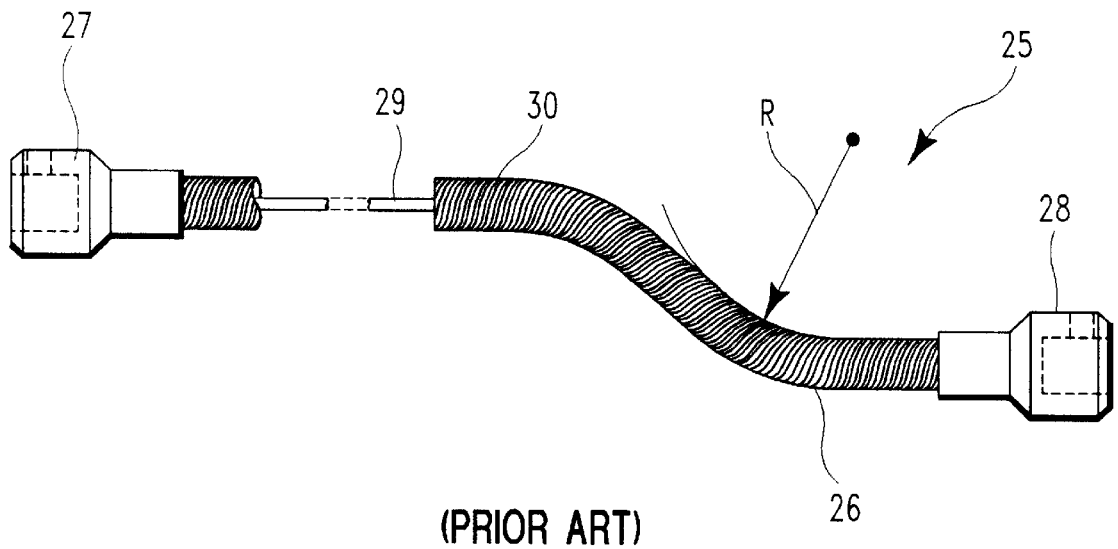
FIG. 2 is a side elevation, with parts broken away, of a prior art flexible shaft assembly comprising the flexible shaft of FIG. 1.

Referring now to the drawings, FIGS. 1 and 2 illustrate a typical prior art flexible shaft assembly 25. Flexible shaft assembly 25 comprises flexible shaft 26 with end fittings 27 and 28 secured thereto for attachment to mating parts. Flexible shaft 26 comprises elongated flexible mandrel 29, preferably made of spring steel, with six layers 31–36 of metal wires 30 wound thereon. The first or inner layer 31 includes a set of four parallel wires 30 wound in a first helical direction along the surface of mandrel 29. The second layer 32 includes six parallel wires 30 wound on layer 31 in a direction transverse to the first helical direction. Third layer 33, fourth layer 34, fifth layer 35 and sixth layer 36 are transversely wound successively on top of each other. Wires 30 attach to each other at their ends and to the ends of mandrel 29. Depending upon the specific application in which flexible shaft 36 will be used, and specifically the physical characteristics desired of the shaft, wires 30 used in each of the six layers may or may not be the same material. For purposes of simplicity, all the wires used with the layers will be assumed to be the same. End fittings 27 and 28 have collars which slide over and secure the fittings to the ends of shaft 26. As seen in FIG. 2, flexible shaft assembly 25 bends at two locations to form a curved axis of rotation having a radius "R," referred to as the "radius of operation." It will become clear to those skilled in the art as this description progresses that FIGS. 1–2 depict only one type of flexible shaft applicable to the present invention and that numerous other shaft constructions are also applicable.

Figure 3:
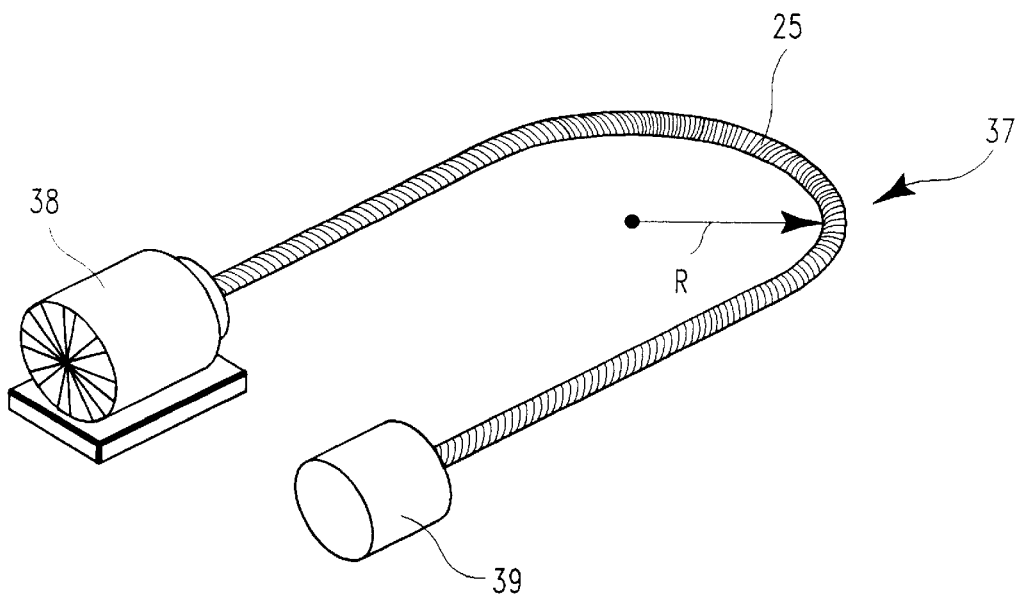
FIG. 3 is a pictorial view of a prior art motorized system illustrating the use of the flexible shaft assembly of FIG. 2 to change the direction of the drive path.
Figure 4:
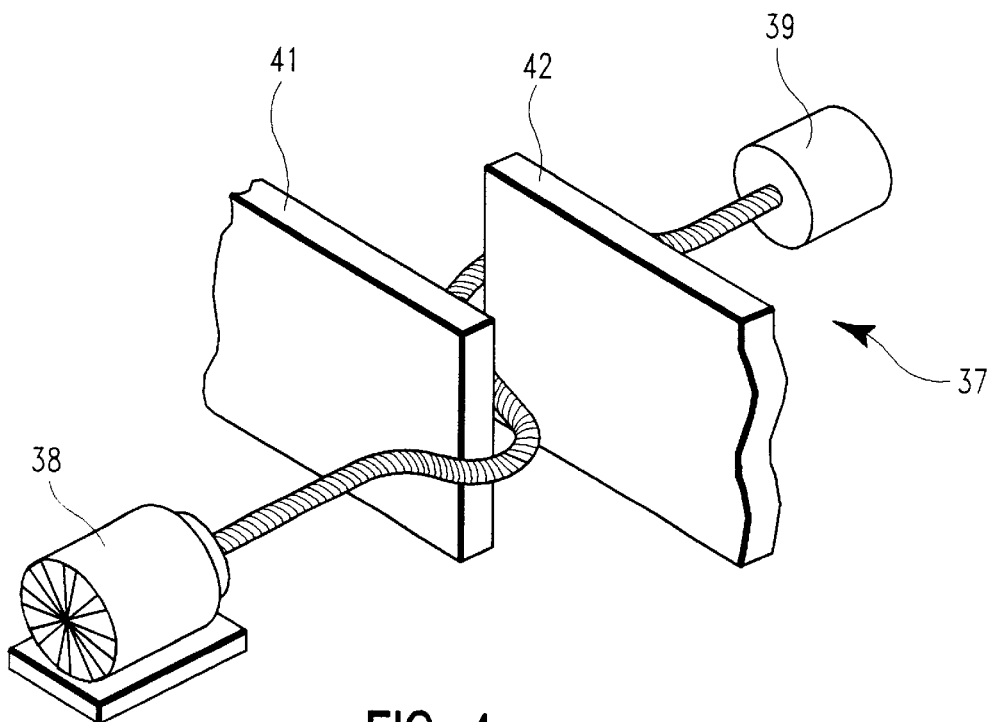
FIG. 4 is a pictorial view of the prior art motorized system of FIG. 3 illustrating the use of the flexible shaft assembly of FIG. 2 to provide a drive path around obstacles.

FIGS. 3 and 4 illustrate flexible shaft assembly 25 as employed in familiar, prior art applications. Specifically, motorized system 37 of FIGS. 3 and 4 includes rotary driver element 38, e.g., an electric motor, connected to rotary driven element 39 via flexible shaft assembly 25. In the FIG. 3. configuration, flexible shaft assembly 25 makes a 180 degree bend, with a radius of operation "R," to cover a U-shaped path between elements 38 and 39. Essentially, the drive path reverses direction in FIG. 3. In the FIG. 4. configuration, flexible shaft assembly 25 makes a number of sharp bends around barriers 41 and 42 to couple elements 38 and 39, which are in substantial alignment. FIGS. 3 and 4 depict only a few of the many shaft configurations that may be found in prior art apparatus, such as machine tools, valve controls, robotics, automobile speedometers, windshield wipers, portable power tools, and others.

FIGS. 5–8 illustrate flexible shaft assembly 50 constructed and employed in accordance with the present invention. Flexible shaft assembly 50 comprises conventional flexible shaft 26 with end fittings 27 and 28. Rigid, linear sleeve 53 coaxially mounts on shaft 26, covering an intermediate portion thereof. After sliding sleeve 53 onto flexible shaft 26, the ends of sleeve 53 are shaped to form end collars 54, which secure sleeve 53 to flexible shaft 26. In fabricating shaft assembly 50, the ends of sleeve 53 can be swaged to form collars 54, which tightly grip flexible shaft 26 such that sleeve 53 and flexible shaft 26 rotate as a unit with substantial rigidity. In most applications, frictional forces between collars 54 and the surface of flexible shaft 26 suffice; however, in some applications collars 54 may need to be cemented, welded, or otherwise fixedly secured to flexible shaft 26. In like manner and after mounting sleeve 53, the fabricator swages or otherwise fixes end fittings 27 and 28 to the opposite ends of shaft 26. It is noted that fittings 27 and 28, typical female connectors, are illustrative only and that other types of connectors, including conventional male connectors (not shown), may be fixed or formed on one or both ends of shaft 26.

Figure 5:
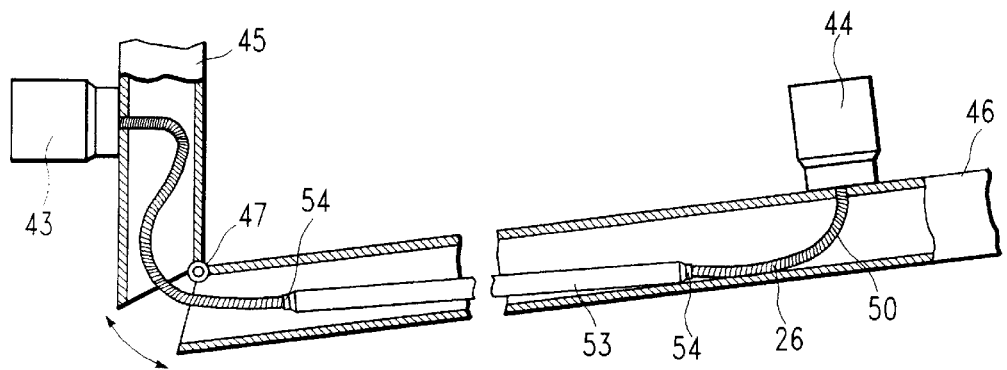
FIG. 5 is a side elevation, with parts broken away and other parts in cross section and looking in the direction of the arrows of the line 5—5 of FIG. 7, showing the flexible shaft assembly, of the present invention, coupling components mounted on moveable parts.
Figure 6:
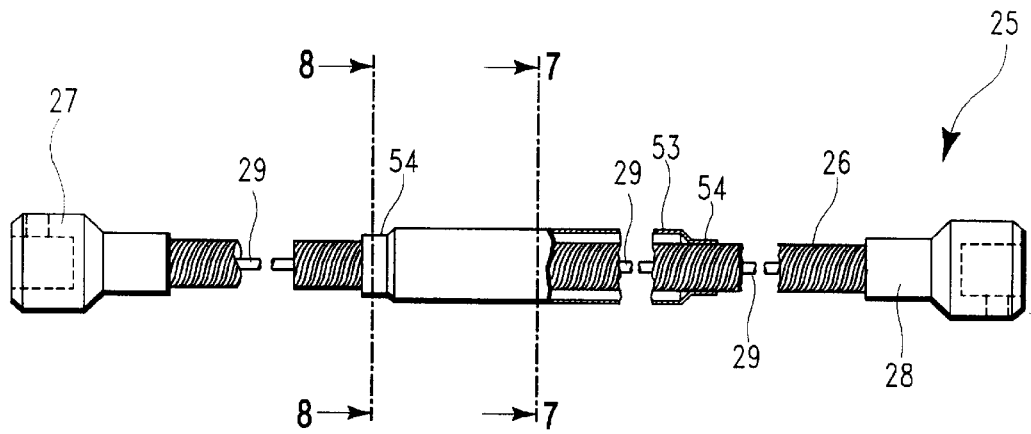
FIG. 6 is a side elevation, with parts broken away and with other parts in cross section, of the flexible shaft assembly of the present invention.
Figure 7:
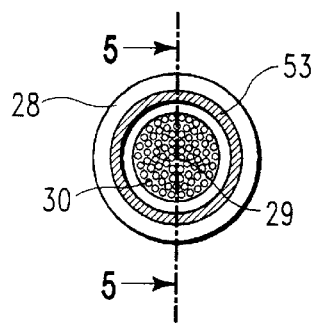
FIG. 7 is a cross section of the flexible shaft assembly of FIG. 6 taken on the line 7—7 of FIG. 6 and looking in the direction of the arrows.
Figure 8:
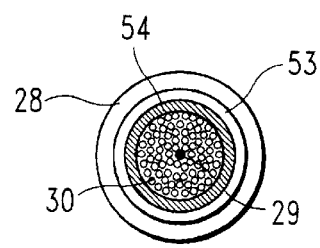
FIG. 8 is a cross section of the flexible shaft assembly of FIG. 6 taken on the line 8—8 of FIG. 6 and looking in the direction of the arrows.

FIG. 5 specifically depicts flexible shaft assembly 50 which can be used to couple spaced, unaligned components mounted on articulated members, such as that shown in FIG. 4. Specifically, shaft assembly 50 couples, as shown in FIG. 4, driver device 43, which mounts on member 45, to driven device 44, which mounts on member 46. Hinge 47 pivotally connects members 45 and 46. Members 45 and 46 exemplify articulated members of a type often found in structures, such as robotics, aircraft, automobiles, buildings, etc. In a representative application, driver device 43 represents a conventional inertial sensor that detects accelerations of member 45 and outputs a rotary motion proportional to the sensed acceleration. As an inertial sensor, driver device 43 often produces a low-torque output having a relatively small angular rotation, e.g., 15 degrees, that must be accurately transmitted to member 46 for actuating driven device 44, which may be a toggle valve, a switch or like device. For the structure to operate effectively, of course, it is important that shaft assembly 50 accurately transmit these rotations with sufficient torque to actuate driven device 44. The problem, therefore, is to select a flexible shaft having sufficient flexibility so that it may easily bend into the required shapes during operation, while having sufficient torsional stiffness so that a low-torque rotation at one end, i.e. the end attaching to device 33, can be accurately transmitted to the other end.

Sleeve 53 primary functions as a shaft stiffener that increases the torsional stiffness of selected sections of shaft 26 to control the amount of torsional deflection that shaft assembly 50 experiences during rotation. Sleeve 53 stiffens shaft 26 in those areas where significant bending flexibility is not needed. More specifically, it is known that the components of a flexible shaft (e.g., wires 30) generate internal friction which increases as its radius of operation "R"

decreases. Further, for a given radius of operation "R," the more flexible the shaft, the lower will be the amount of internal friction. The torque needed to overcome the resistance due to this internal friction is called the "torque to rotate." As such, the torque-to-rotate value of a given shaft is normally specified for a specific radius of operation "R." It follows, therefore, that the more flexible the shaft, i.e., the higher the bending flexibility, the lower will be the torque to rotate for a given radius of operation.

Torsional stiffness and torsional deflection denote inverse parameters of a flexible shaft. Torsional stiffness specifies a measure of the resistance of the shaft to an applied torque, i.e., a twisting or a torsional force, about its rotational axes. Torsional deflection designates the degree of twist per unit length that a flexible shaft will experience due to an applied torque. The torsional deflection is usually expressed in degrees per foot per pound-inch (deg/ft/lb-in); its inverse, torsional stiffness, is expressed in units of lb-in/ft/deg.

Therefore, when choosing a flexible shaft, the length of the smallest radius of operation and the magnitude of the input torque are important factors in determining the bending flexibility of the shaft. The following conditions should be met when selecting a flexible shaft: first, the shaft must have sufficient bending flexibility so as not to be damaged when flexed into its smallest radius of operation; second, the shaft must have sufficient flexibility so that the torque-to-rotate value at the smallest radius of operation is at least less than the input torque, i.e., the output torque of the driver element; and third, the shaft must have sufficient torsional stiffness to accurately transmit rotary motion with a minimum of torsional deflection.

In many applications, such as the one depicted in FIG. 5, a flexible shaft must traverse a relatively long path made up of tortious, variably shaped sections having sharp bends, and relatively straight sections where the shaft need not bend. For the FIG. 5 configuration, the proximal end of shaft assembly 50 makes an arcuate path with several bends where it connects to driver member 43 and in the region of hinge 47. In the region of hinge 47, the arcuate shape of shaft assembly 50 changes as the angle between articulated members 45 and 46 changes. The distal end of shaft assembly 50 forms an arch of about ninety degrees where it connects to driven device 44. An intermediate section of shaft assembly 50 traverses a relatively straight path within member 46.

Since driver device 43 may produce relatively low output torques with small angular rotations, as in the case of an inertial sensor, shaft assembly 50 will need sufficient torsional stiffness to accurately transmit these rotations to driven element 44. However, shaft assembly 50 must also have sufficient bending flexibility so that it may easily make the necessary sharp bends at its proximal and distal ends, especially near hinge 47, without generating undue internal friction during rotation and causing high torque-to-rotate values.

Shaft assembly 50 minimizes torsional deflections while providing sufficient bending flexibility in those regions where it is needed. Specifically, sleeve 53, which has a relatively large torsional stiffness and relatively small bending flexibility, reduces or virtually eliminates torsional deflections in those sections of shaft 26 where bending flexibility is not required. Sufficient flexibility in the remaining sections of shaft 26 provide the required bending flexibility so that shaft assembly 50 may easily assume its smallest required radius of operation.

The angular deflection of a typical three-foot long flexible shaft 26 may be reduced more than forty percent with the application of a sleeve 53 that covers less than half the length of shaft 26. More specifically, assume a representative implementation of the FIG. 5 configuration wherein a sixteen-inch (16") long sleeve 53 is centered on a three-foot (3') long flexible shaft 26 having a diameter of three-sixteenths of an inch (3/16"). Assume further that sleeve 53 is made from a steel tube having an outside diameter of one-quarter inch (¼") and a wall thickness of three-hundredths of an inch (0.03"). A standard flexible shaft having a diameter of 3/16 typically exhibits a torsional stiffness "$C_{shaft}$" of about 0.32 pound-inches per degree per foot (lb-in/deg/ft) when rotated in the direction that causes metal wires 30 of outer layer 36 to compress and tighten down on the rest of shaft 26 (see FIG. 1). A standard steel tube having the assumed dimensions of sleeve 53 would exhibit a torsional stiffness "$C_{tube}$" of 4.46 lb-in/deg/ft. Therefore, the effective torsional stiffness "$C_{eff}$" for the center section of shaft assembly 50, i.e., where sleeve 53 is located, equals $C_{tube}+C_{shaft}$=4.78 lb-in/deg/ft.

To summarize, the illustrative shaft assembly 50 has a 36" long flexible shaft 26 with two 10" long end sections each having a torsional stiffness $C_{shaft}$ of 0.32 lb-in/deg/ft, and an intermediate 16" long section with a stiffener (sleeve 53) to yield an effective torsional stiffness $C_{eff}$ of 4.78 lb-in/deg/ft. Consequently, the overall torsional stiffness $C_{total}$ for the illustrative 36" long shaft assembly 50, which functions as three series connected springs, may be calculated as follows:

$$C_{total} = \frac{36"}{\frac{10"}{C_{shaft}} + \frac{16"}{C_{eff}} + \frac{10"}{C_{shaft}}} ;$$

$$C_{total} = \frac{36}{\frac{10}{0.32} + \frac{16}{4.78} + \frac{10}{0.32}} = 0.547 \text{ lb-in/deg/ft.}$$

Further, the torsional deflection ($\phi$ degrees) of flexible shaft assembly 50 is a function of applied torque (T lb-in) and torsional stiffness ($C_{total}$ lb-in/deg/ft). As such, the torsional deflection per unit torque for the 3' long shaft assembly 50 having the parameters assumed above will be:

$$\frac{\phi}{T} = \frac{3'}{0.547 \text{ lb-in/deg/ft}} = 5.48 \text{ deg/lb-in.}$$

On the other hand, the torsional deflection per unit torque for a 3' length of the illustrative flexible shaft 26 alone, i.e., with no stiffener such as sleeve 53, would be:

$$\frac{\phi}{T} = \frac{3'}{C_{shaft}} = \frac{3}{0.32} = 9.38 \text{ deg/lb-in.}$$

Hence, for the above illustrative example, the use of sleeve 53 reduces torsional deflection per unit torque from 9.38 deg/lb-in to 5.48 deg/lb-in, i.e., a reduction of 42 percent.

Figure 9:
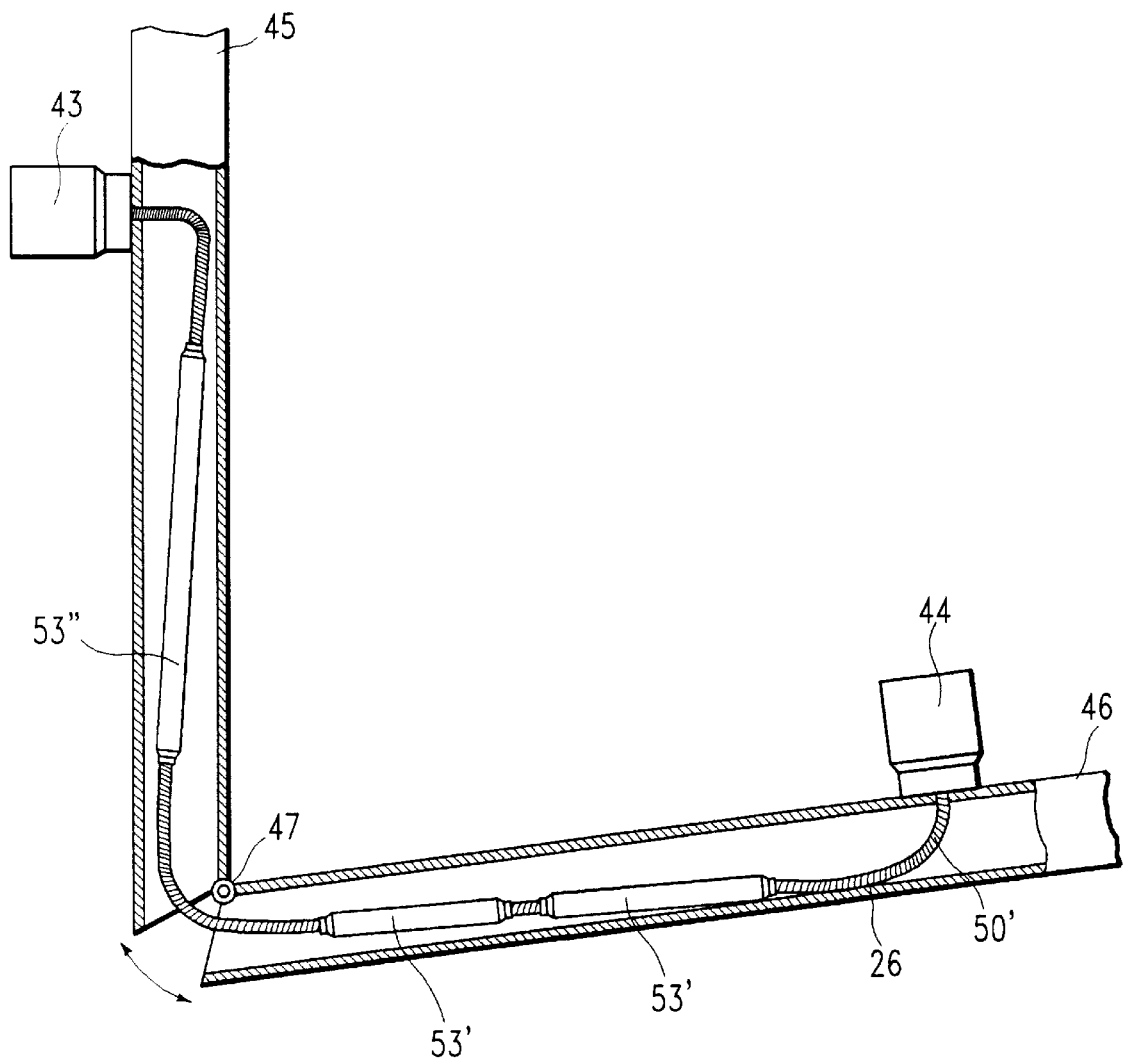
FIG. 9 is a side elevation, similar to the FIG. 5 side elevation with parts broken away and parts in cross section, of an alternate embodiment of the present invention wherein a flexible shaft assembly has a plurality of shaft stiffeners for coupling components mounted on moveable parts.

FIG. 9 illustrates an alternate embodiment of the invention wherein shaft assembly 50' comprises flexible shaft 26 having a plurality of sleeves 53' and 53" spaced along its length. The FIG. 9 configuration teaches the use of a plurality of relatively short sleeves 53' as a replacement for the single, relatively long sleeve 53 shown in the FIG. 5 configuration. It has been found that in many circumstance, e.g., during handling, installation, shipping, etc., the relatively long sleeve 53 of FIG. 5 often becomes inadvertently bent. For example, when handling flexible shaft assembly 50 during manufacture, people tend to pick the assembly up by sleeve 53. This action often results in bending sleeve 53, especially in those instances where a heavy object is attached to an end of flexible shaft 26. To insure proper operation, it is usually desirable that shaft stiffeners, such as sleeve 53, be relatively straight. Consequently, by using a number of shorter sleeves 53' in place of a longer sleeve as seen in FIG. 9, less bending torque will be applied to each individual sleeve 53' during handling. Of course, the combination of the two sleeves 53' must provide sufficient torsional stiffness to adequately reduce torsional deflection for the purpose intended.

The FIG. 9 embodiment also teaches placing individual shaft stiffeners in separate regions of flexible shaft 26 where bending flexibility is not needed. In a manner similar to the FIG. 5 configuration, shaft assembly 50' of FIG. 9 has proximal and distal ends which bend where they connect to driver member 43 and driven device 44, respectively. However, unlike the FIG. 5 configuration, shaft assembly 50' of FIG. 9 has an intermediate section which traverses two relatively straight paths, one within each of members 45 and 46 separated by the hinged region where flexible shaft 26 must bend. In the region of hinge 47, shaft assembly 50' bends as the angle between articulated members 45 and 46 changes. Consequently, shaft assembly 50' has sleeve 53'' mounted on that portion of flexible shaft 26 located within member 45 in addition to those sleeves 53' located within member 46.

Obviously many modifications and variations of the present invention are possible in the light of the above teachings. For example, sleeve 53 represents only a preferred form of a shaft stiffener applicable to the present invention. Other types of stiffeners, e.g., a relatively firm bar, may be fixed along the side of or wound around flexible shaft 26 to eliminate or reduce torsional deflections. It is to be understood, therefore, that within the scope of the appended claims, the invention may be practiced otherwise than as specifically described.

What is claimed is:

1. A flexible shaft assembly comprising:
   a flexible shaft having a plurality of coiled, flexible wires with a number of full turns to provide said shaft with a predetermined bending flexibility, said flexible shaft having a proximal section, a distal section and an intermediate section, said proximal and distal sections each capable of being rotated about curved axes; and
   a relatively straight rigid member fixed to a region of said intermediate section, said region including a plurality of said full turns, said rigid member having a torsional stiffness substantially greater than that of said flexible shaft, and said rigid member and said region secured as a unit for rotation about a linear axis.

2. The flexible shaft assembly of claim 1 wherein said rigid member includes a sleeve coaxially mounted about said region.

3. The flexible shaft assembly of claim 2 wherein said rigid member includes collars located at the ends of said sleeve, said collars swaged into fixed, frictional engagement with portions of said intermediate section of said shaft such that a plurality of said full turns are located between said collars.

4. The flexible shaft assembly of claim 3 wherein said curved axes form an arc of at least forty-five degrees.

5. The flexible shaft assembly of claim 4 wherein said proximal and distal sections include shaft connector means for attachment to mating parts.

6. A flexible shaft assembly comprising:
   a flexible shaft having a plurality of coiled, flexible wires with a number of full turns to provide said shaft with a predetermined bending flexibility, said flexible shaft having a proximal section, a distal section and an intermediate section, said proximal and distal sections each capable of being rotated about curved axes; and
   a plurality of relatively straight rigid members, each said rigid member fixed to a separate region of said intermediate section, each said region including a plurality of said full turns, each said rigid member having a torsional stiffness substantially greater than that of said flexible shaft, and each said rigid member and the corresponding one of each said region secured for rotation as a unit about a linear axis.

7. The flexible shaft assembly of claim 6 wherein each said rigid member includes a sleeve coaxially mounted about said corresponding one of said regions.

8. The flexible shaft assembly of claim 7 wherein each said rigid member includes collars located at the ends of said sleeve, said collars swaged into fixed, frictional engagement with portions of said intermediate section of said shaft such that a plurality of said full turns are located between said collars of each said sleeve.

9. The flexible shaft assembly of claim 8 wherein said curved axes form an arc of at least ninety degrees.

10. The flexible shaft assembly of claim 9 wherein said proximal and distal sections include shaft connector means for attachment to mating parts.

11. A flexible shaft assembly comprising:
    a flexible shaft having a plurality of coiled, flexible wires with a number of full turns to provide said shaft with a predetermined bending flexibility, said flexible shaft having a proximal section, a distal section and an intermediate section, each said proximal and distal sections capable of being rotated about curved axes; and
    a stiffener means fixed to a region of said intermediate section, said region including a plurality of said full turns, for causing said stiffener means and said region to rotate as a unit about a linear axis and for increasing the torsional stiffness of said intermediate section to substantially reduce torsional deflection between the ends of said flexible shaft when said flexible shaft rotates.

12. The flexible shaft assembly of claim 11 wherein said stiffener means includes a rigid sleeve coaxially mounted about said region.

13. The flexible shaft assembly of claim 12 further including collars mounted at the ends of said sleeve, said collars swaged into fixed, frictional engagement with portions of said intermediate section of said shaft such that a plurality of said full turns are located between said collars.

14. The flexible shaft assembly of claim 13 wherein said curved axes form an arc of at least forty-five degrees, and said proximal and distal sections include shaft connector means for attachment to mating parts.

15. A flexible shaft assembly comprising:
    a flexible shaft having a plurality of coiled, flexible wires with a number of full turns to provide said shaft with a predetermined bending flexibility, said flexible shaft having a proximal section, a distal section and an intermediate section, each said proximal and distal section capable of being rotated about carved axes; and
    a stiffener means fixed to regions of said intermediate section, each said region including a plurality of said full turns, for causing each said stiffener means and a corresponding one of said regions to rotate as a unit about a linear axis, and for increasing the torsional stiffness of said intermediate section to substantially reduce torsional deflection between the ends of said flexible shaft when said flexible shaft rotates.

16. The flexible shaft assembly of claim 15 wherein said stiffener means includes a plurality of rigid sleeves each coaxially mounted about a different one of said regions and spaced along said intermediate section of said shaft.

17. The flexible shaft assembly of claim 16 wherein said curved axes form an arc of at least forty-five degrees, and said proximal and distal sections include shaft connector means for attachment to mating parts.

18. A system for transmitting rotary motion between spaced rotary components comprising:

a first rotary component;

a second rotary component spaced from said first rotary component;

a flexible shaft having a plurality of coiled, flexible wires with a number of full turns to provide said shaft with a predetermined bending flexibility, said flexible shaft having a proximal section connected to said first rotary component, a distal section connected to said second rotary component, and an intermediate section, said proximal and distal sections each capably of being rotated about curved axes; and a stiffener means fixed to a region of said intermediate section, said region including a plurality of said full turns, for causing said stiffner means and said region to rotate as a unit about a linear axis and for increasing the torsional stiffness of said intermediate section to reduce torsional deflection between the ends of said flexible shaft when said flexible shaft rotates.

19. The system of claim 18 wherein said first rotary component mounts on a first member and said second rotary component mounts on a second member, said first and second members pivoted to each other, and said flexible shaft extending along said first and second members.

20. The system of claim 19 wherein said stiffener means includes a rigid sleeve coaxially mounted about said region with collars located at the ends of said sleeve, said collars swaged into fixed, frictional engagement with portions of said intermediate section of said shaft, and said flexible shaft includes a flexible mandrel supporting a plurality of said wires wound in a series of superimposed transversely directed layers.

21. A method of transmitting rotary motion between spaced components comprising:

forming a flexible shaft by coiling a plurality of flexible wires into a number of full turns to provide said flexible shaft with a predetermined bending flexibility, said flexible shaft having a proximal section, a distal section and an intermediate section, said proximal and distal sections each capable of being rotated about curved axes;

connecting a rotary driver component to an end of said proximal section;

connecting a rotary driven component to an end of said distal section;

preventing a predetermined plurality of full turns in said intermediate section from undergoing substantial torsional deflection when said rotary driver component rotates said flexible shaft; and rotating said flexible shaft with said rotary driver component to rotate said rotary driven component.

22. The method of claim 21 wherein said step of preventing substantial torsional deflection includes securing a stiffener to a region of said intermediate section for causing said region, said predetermined plurality of consecutive ones of said full turns and said stiffener to rotate as a unit substantially about a linear axis.

23. The method of claim 22 further including mounting said rotary driver component on a first member, mounting said rotary driven component on a second member articulated to said first member, and extending said flexible shaft along said first and second members, and wherein said step of securing a stiffener includes coaxially mounting a rigid sleeve about said intermediate section, and swaging ends of said sleeve into fixed, frictional engagement with portions of said intermediate section.

24. The method of claim 23 wherein said forming step includes forming said flexible shaft with said predetermined bending flexibility such that said curved axes form an arc of at least forty-five degrees.

25. The method of claim 21 wherein said step of preventing substantial torsional deflection includes securing a plurality of stiffeners to said intermediate section for causing spaced regions of said intermediate section to rotate substantially about respective linear axes.

26. The method of claim 25 further including mounting said rotary driver component on a first member, mounting said rotary driven component on a second member articulated to said first member, and extending said flexible shaft along said first and second members such that at least one of said stiffeners extends along each of said first and second members, and wherein said step of securing a plurality of stiffeners includes coaxially mounting a rigid sleeve about each said region, and swaging ends of said sleeves into fixed, frictional engagement with portions of said intermediate section.

27. A method of connecting a driver device to a driven component with a flexible shaft that extends over a path having at least one linear section and one curved section with a bend of at least forty-five degrees, said flexible shaft having a plurality of flexible wires coiled into a number of full turns to provide said flexible shaft with a predetermined torsional stiffness, the method comprising the steps of:

determining the region of said flexible shaft to be located at said linear section, said region comprising a predetermined plurality of said full turns;

securing a stiffener to said region, said stiffener having a torsional stiffness substantially greater than said predetermined torsional stiffness of said flexible shaft; and coupling said driver device to said driven component with said flexible shaft such that said stiffener extends over said linear section.

28. The method of claim 27 further including mounting said driver device on a first member, mounting said driven component on a second member articulated to said first member, and extending said flexible shaft along said first and second members, and wherein said step of securing a stiffener includes coaxially mounting a rigid sleeve about said region, and swaging ends of said sleeve into fixed, frictional engagement with portions of said intermediate section.

* * * * *